US005774524A

United States Patent [19]
Yang

[11] Patent Number: 5,774,524
[45] Date of Patent: Jun. 30, 1998

[54] TELEPHONE TEST DEVICE AND METHOD OF THE SAME FOR OPTICAL CABLE TELEVISION SYSTEM

[75] Inventor: Jin-Hyung Yang, Kyonggi-do, Rep. of Korea

[73] Assignee: Hyundai Electronics Industries Co., Inc., Seoul, Rep. of Korea

[21] Appl. No.: 681,714

[22] Filed: Jul. 29, 1996

[30] Foreign Application Priority Data

Jul. 28, 1995 [KR] Rep. of Korea ................. 1995-22778

[51] Int. Cl.$^6$ ............................. H04M 1/24; H04M 3/08; H04M 3/22
[52] U.S. Cl. .................................. 379/1; 379/22; 379/28; 379/26; 348/6; 348/192; 455/3.1; 455/6.1
[58] Field of Search .................... 379/1, 27, 28, 379/29, 30, 31, 32, 22, 24, 26; 348/6, 7, 12, 13, 192; 455/3.1, 6.1

[56] References Cited

U.S. PATENT DOCUMENTS

| | | | |
|---|---|---|---|
| 4,245,245 | 1/1981 | Matsumoro et al. | 358/122 |
| 4,404,514 | 9/1983 | Reichert, Jr. | 455/5.1 |
| 4,430,731 | 2/1984 | Gimple et al. | 370/30 |
| 4,533,948 | 8/1985 | McNamara et al. | 358/122 |
| 4,577,312 | 3/1986 | Nash | 370/112 |
| 4,633,462 | 12/1986 | Stifle et al. | 358/86 |
| 4,768,188 | 8/1988 | Barnhart et al. | 370/80 |
| 4,817,144 | 3/1989 | Citta et al. | |
| 4,977,593 | 12/1990 | Ballance | 348/6 |
| 5,014,125 | 5/1991 | Pocock et al. | 348/7 |
| 5,086,470 | 2/1992 | Ballance . | |
| 5,245,420 | 9/1993 | Harney et al. | 348/7 |
| 5,408,260 | 4/1995 | Arnon . | |
| 5,421,030 | 5/1995 | Baran . | |
| 5,508,731 | 4/1996 | Kohorn | 348/1 |
| 5,537,143 | 7/1996 | Steingold et al. | 348/6 |
| 5,559,858 | 9/1996 | Beveridge | 379/56.2 |
| 5,592,540 | 1/1997 | Beveridge | 379/184 |
| 5,621,455 | 4/1997 | Rogers et al. | 348/6 |
| 5,625,416 | 4/1997 | Tseng et al. | 348/6 |
| 5,664,002 | 9/1997 | Skinner, Sr. | 379/56.2 |
| 5,682,195 | 10/1997 | Hendricks et al. | 348/6 |

Primary Examiner—Curtis Kuntz
Assistant Examiner—Rexford N. Barnie
Attorney, Agent, or Firm—Bryan Cave LLP

[57] ABSTRACT

An improved telephone test device and a method of the same for an optical cable television which are capable of easily testing a telephone function of an optical cable television system by connecting to the subscriber's line of the optical cable television system without using an additional switch system, which includes the steps of a first step for initializing a database, selecting a predetermined bus, Cept interface boards-10, and a hardware, executing a menu, and judging the inputted menu; a second step for performing an extended common control board assembly loop-back test routine when the extended common control board assembly is selected in the first step for testing the extended common control board assembly loop-back; a third step for performing Cept interface boards-10 loop-back test routine when the loop-back is selected in the first step for performing the Cept interface boards-10 loop-back; a fourth step for performing a common test routine when the common test is selected in the first step; a fifth step for performing a subscriber hook state detection routine for detecting the subscriber hook state when the hook state detection routine is selected in the first step; a sixth step for reading a line number when the writing routine is selected in the first step, reading a control data, and writing the control data on a corresponding line number; and a seventh step for ending a test routine when the end is selected in the first step.

8 Claims, 7 Drawing Sheets

FIG. 3(A-1)
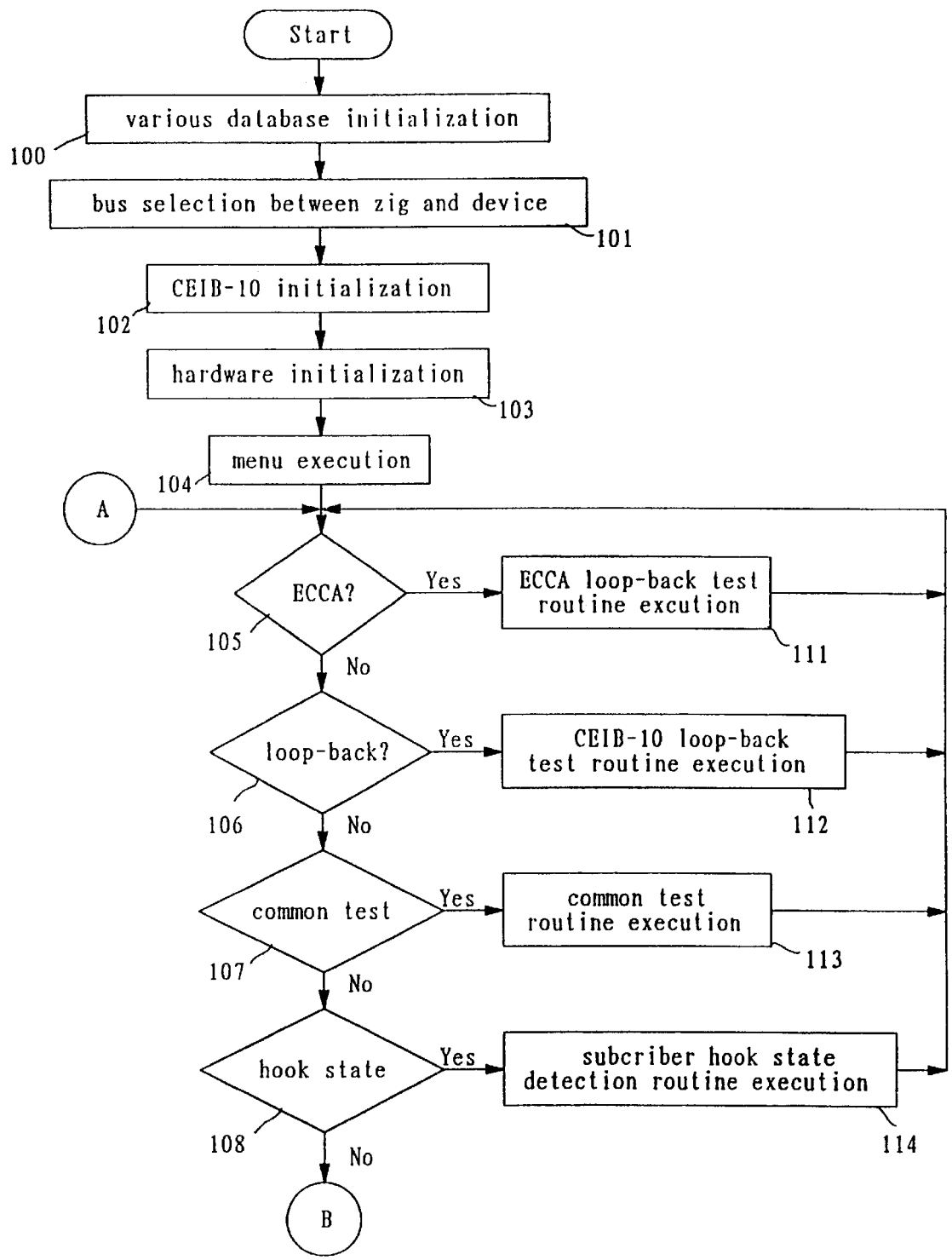

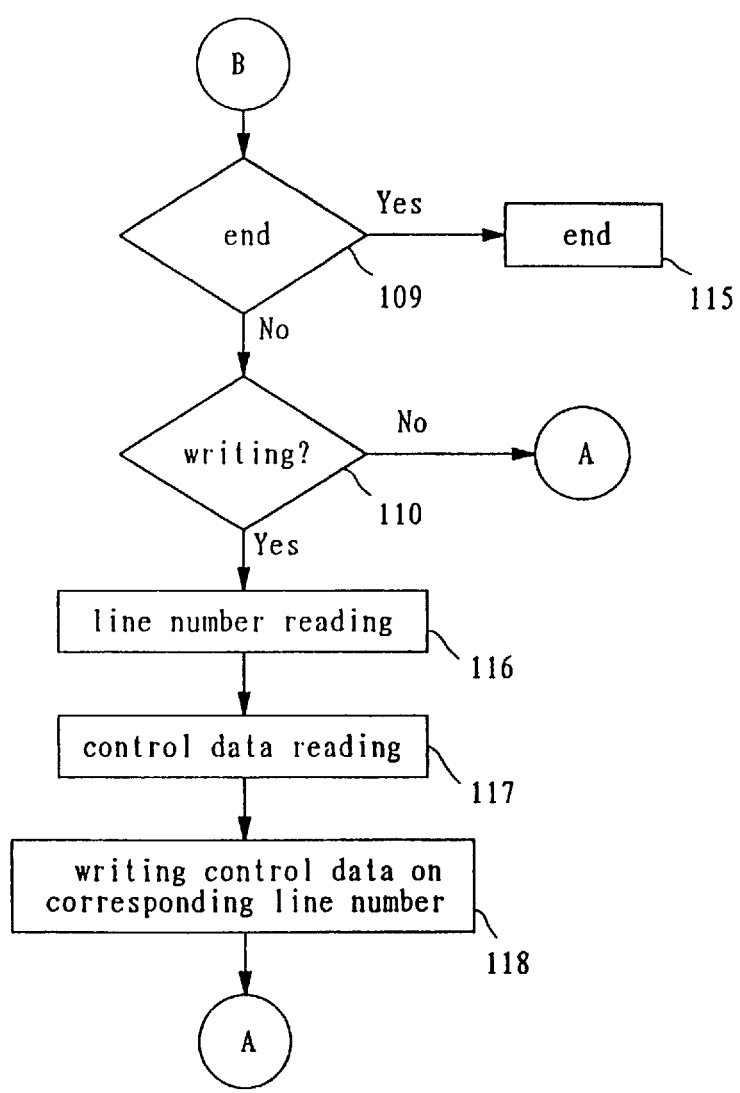
FIG. 3(A-2)

TELEPHONE TEST DEVICE AND METHOD OF THE SAME FOR OPTICAL CABLE TELEVISION SYSTEM

BACKGROUND OF THE INVENTION

1. Field of the Invention

The present invention relates to a telephone test device and a method of the same for an optical cable television system, and particularly to an improved telephone test device and a method of the same for an optical cable television system which are capable of easily testing a telephone function of an optical cable television system.

2. Description of the Conventional Art

Generally, an optical cable television system is directed to transmitting a television broadcast signal using an optical cable and offering a telephone function service using a "B" channel.

So as to offer the telephone function service using the "B" channel, the test line should be additionally allocated for a switching system so as to test the function of the telephone, and then a telephone set is connected to the thusly allocated test line.

For example, when testing the ring signal, the ring signal is applied to the test line. Thereafter, it is tested as to whether the ring signal is outputted from the telephone set in accordance with the outputted ring signal.

Therefore, so as to effectively test the telephone function of the optical cable television system, the subscriber's line connected to the switching system should be additionally allocated as a test line. In addition, it takes too much time for testing the line.

SUMMARY OF THE INVENTION

Accordingly, it is an object of the present invention to provide a telephone test apparatus and a method of the same for an optical cable television, which overcome the problems encountered in a conventional telephone test device and a method of the same for an optical cable television.

It is another object of the present invention to provide an improved telephone test device and a method of the same for an optical cable television which are capable of easily testing the telephone function of an optical cable television system.

It is another object of the present invention to provide an improved telephone test device and a method of the same for an optical cable television which are capable of easily testing the telephone function of an optical cable television system by connecting to the subscriber's line of the optical cable television system without using an additional switch system, thus reducing the number of elements of the system and the manufacturing cost, whereby the productivity is significantly enhanced thereby.

To achieve the above objects, there is provided a telephone test method for an optical cable television which includes the steps of a first step for initializing a database, selecting a predetermined bus, Cept interface boards-10, and a hardware, executing a menu, and judging the inputted menu; a second step for performing an extended common control board assembly loop-back test routine when the extended common control board assembly is selected in the first step for testing the extended common control board assembly loop-back; a third step for performing Cept interface boards-10 loop-back test routine when the loop-back is selected in the first step for performing the Cept interface boards-10 loop-back; a fourth step for performing a common test routine when the common test is selected in the first step; a fifth step for performing a subscriber hook state detection routine for detecting the subscriber hook state when the hook state detection routine is selected in the first step; a sixth step for reading a line number when the writing routine is selected in the first step, reading a control data, and writing the control data on a corresponding line number; and a seventh step for ending a test routine when the end is selected in the first step.

To achieve the above objects, there is provided a telephone test device for an optical cable television which includes Cept interface boards-10 connected to an optical cable television for processing a subscriber signal; an extended common control board assembly for relaying the signal of the Cept interface boards-10; a peripheral processor hardware board assembly for connecting the extended common control board assembly and a personal computer, performing an ASIP function of a TDX-10, a TD bus communication with the Cept interface boards-10, and a control of the telephone function; a Ceib clock generator board for supplying a clock signal; and a power board unit for supplying an operation power.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 3A through 3F are flow charts showing the test method of a telephone test device according to the present invention.

DETAILED DESCRIPTION OF THE INVENTION

The telephone test method and device adapting the same for an optical cable television system will now be described with reference to FIGS. 1A through 3F.

Figure 1A:
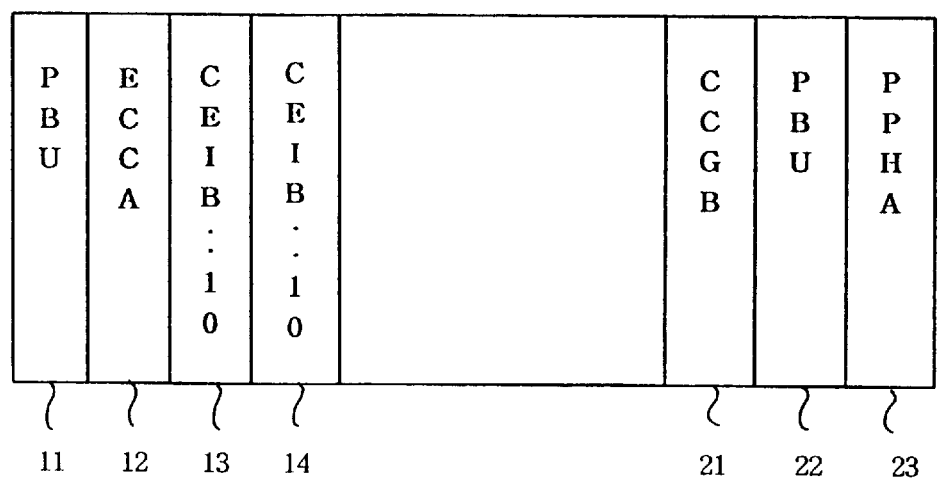
FIG. 1A is a view showing the construction of the front side of a telephone test device according to the present invention.
Figure 1B:
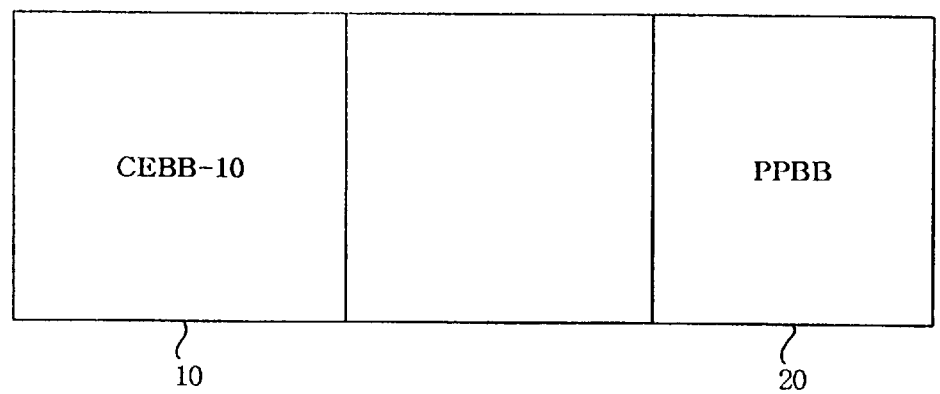
FIG. 1B is a view showing the construction of the rear side of a telephone test device according to the present invention.

To begin with, FIGS. 1A and 1B show the construction of the front and rear sides of a telephone test device according to the present invention.

As shown therein, the telephone test deice according to the present invention includes a power board unit (PBU) 11 for supplying an operation power to a front and left side of the telephone test device, an extended common control board assembly (ECCA) 12 for performing the relay operation of the signal, CEIB-10 (CEpt Interface Board-10) 13 and 14 connected to the optical cable television system for processing the signals of a subscriber, a Ceib clock generator board (CCGB) 21 for generating a clock signal and for supplying to corresponding elements, a power board unit (PBU) 22 for supplying an operation power to corresponding elements, a peripheral processor hardware board assembly (PPHA) 23, a CEBB-10 (CEpt Back Board-10) on which the PBU 11 and the ECCA 12 are mounted, and a peripheral processor back board (PPBB) 20 on which the CCGB 21, the PBU 22, and the PPHA 23 are mounted.

Figure 2:
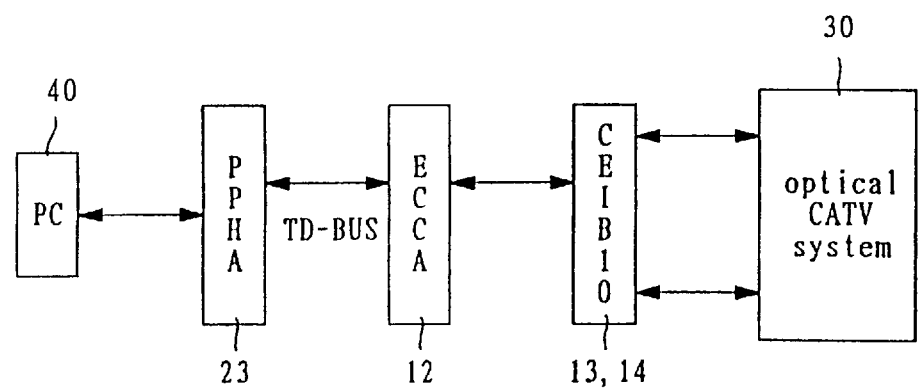
FIG. 2 is a block diagram showing the construction of a telephone test device according to the present invention.

FIG. 2 shows the construction of the telephone test device according to the present invention.

As shown therein, the device includes a CEIB-10 13 and 14 connected to the optical cable television system 30 for processing the signals of the subscriber, an ECCA 12 for relaying the signals of the CEIB-10 13 and 14, and a PPHA 23 for connecting the ECCA 12 and a personal computer 40.

Here, the CEIB-10 13 and 14 adapted for processing the signals of the subscriber supply a basic clock signal of 4 Mhz and 8 Mhz applied thereto from the switch and four sub-highways through which audio signals pass.

The ECCA 12 is connected between the CEIB-10 and the PPHA 23 and serves as a relay, and the PPHA 23, in which a predetermined program is loaded for performing the test method, performs the function of an analog subscriber interface processor of the TDX-10, performs a TD bus communication with the CEIB-10 13 and 14, and controls the control operation of the telephone function.

In addition, the CCGB 21 fore supplying a clock signal includes a clock generator, a frame synchronous generator (FS), and a PCM transmitting/receiving data connector; of which, the clock generator is directed to supplying the clock signal of 2.04 Mhz and 4.096 Mhz to the ECCA 12, the FS generator is directed to generating the FS of 8 Khz from a clock signal of 4.096 Mhz and then supplying to the ECCA 12, and the PCM transmitting/receiving data connector is directed to connecting a transmitting/receiving PCM differential data.

Meanwhile, the test method according to the present invention includes the steps of a step 100 for initializing various database, a step 101 for selecting a predetermined bus between a zig and a device, a step 102 for initializing the CEIB-10 13 and 14, a step 103 for initializing the hardware, a step 104 for executing the menu, and steps 105 through 110 for judging the inputted menu.

Here, when the ECCA is selected in the step 105, an ECCA loop-back test routine is performed in a step 111. When the loop-back is selected in the step 106, a CEIB-10 loop-back test routine is performed in a step 112. When a common test is selected in the step 107, a common test routine is performed in a step 113. When a hook state is selected in the step 108, a subscriber hook state detection routine is performed in a step 114. When an operation end is selected in the step 109, a test operation is ended in a step 115. When a writing function is selected in the step 110, a line number is read in a step 116. After the control data is read in a step 117, the control data is written in a corresponding line number in a step 118, and then the routine is returned to the step 105.

Figure 3B:
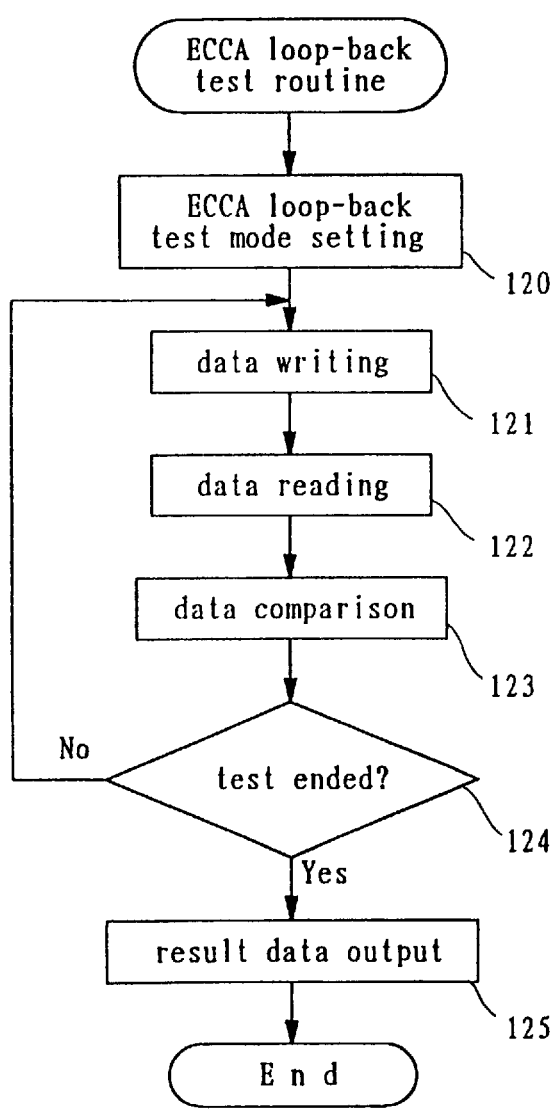

In the ECCA loop-back test routine in the step 111, as shown in FIG. 3B, a loop-back test mode is set in a step 120. A data is written in a step 121. The data is read in a step 122. The written and read data are compared to each other in a step 123. Whether the test is finished or not is judged in a step 124. As a result, when the test is not finished, the routine is repeated from the step 121. When the test is finished, the comparison result data is outputted in a step 125.

Figure 3C:
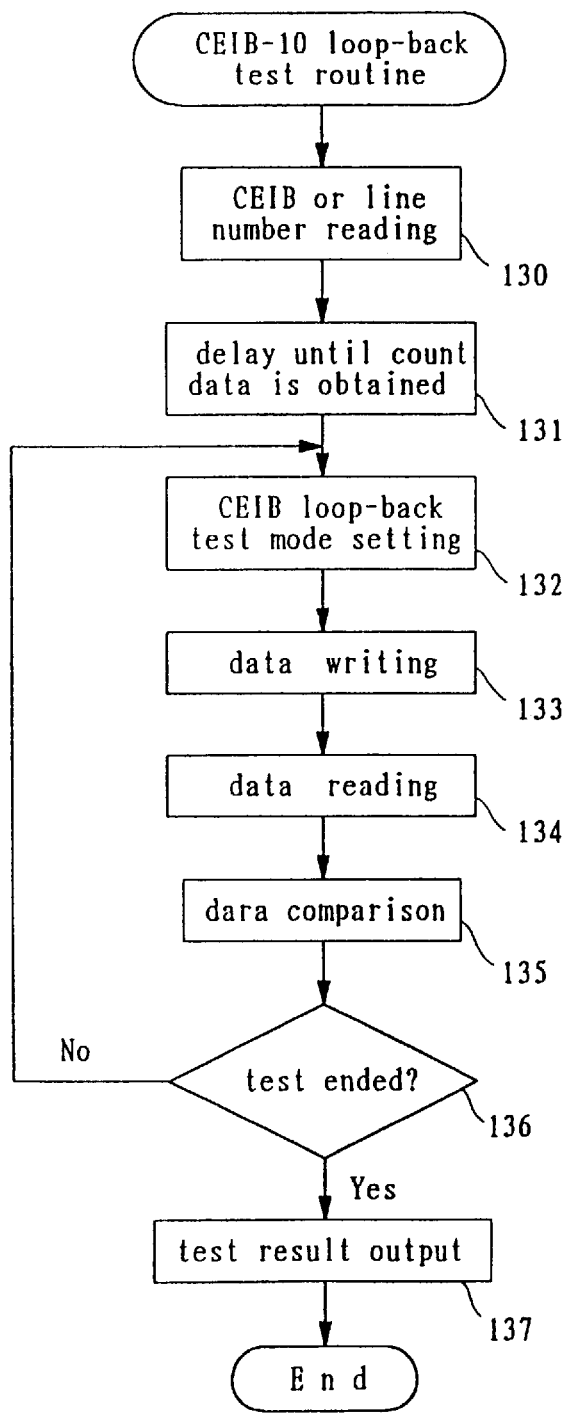

In the CEIB-10 loop-back test routine of the step 112, as shown in FIG. 3C, the CEIB-10 or the line number are read in a step 130. The routine is delayed until the count data is obtained in a step 131. The loop-back test mode is set in a step 132, and the data is written in a step 133. The data is read in a step 134, and the written and read data are compared in a step 135. Whether the test is finished or not is judged in a step 136. As a result, when the test is not finished, the routine is repeated from the step 132. When the test is finished, the test comparison result data is outputted in a step 137.

Figure 3D:
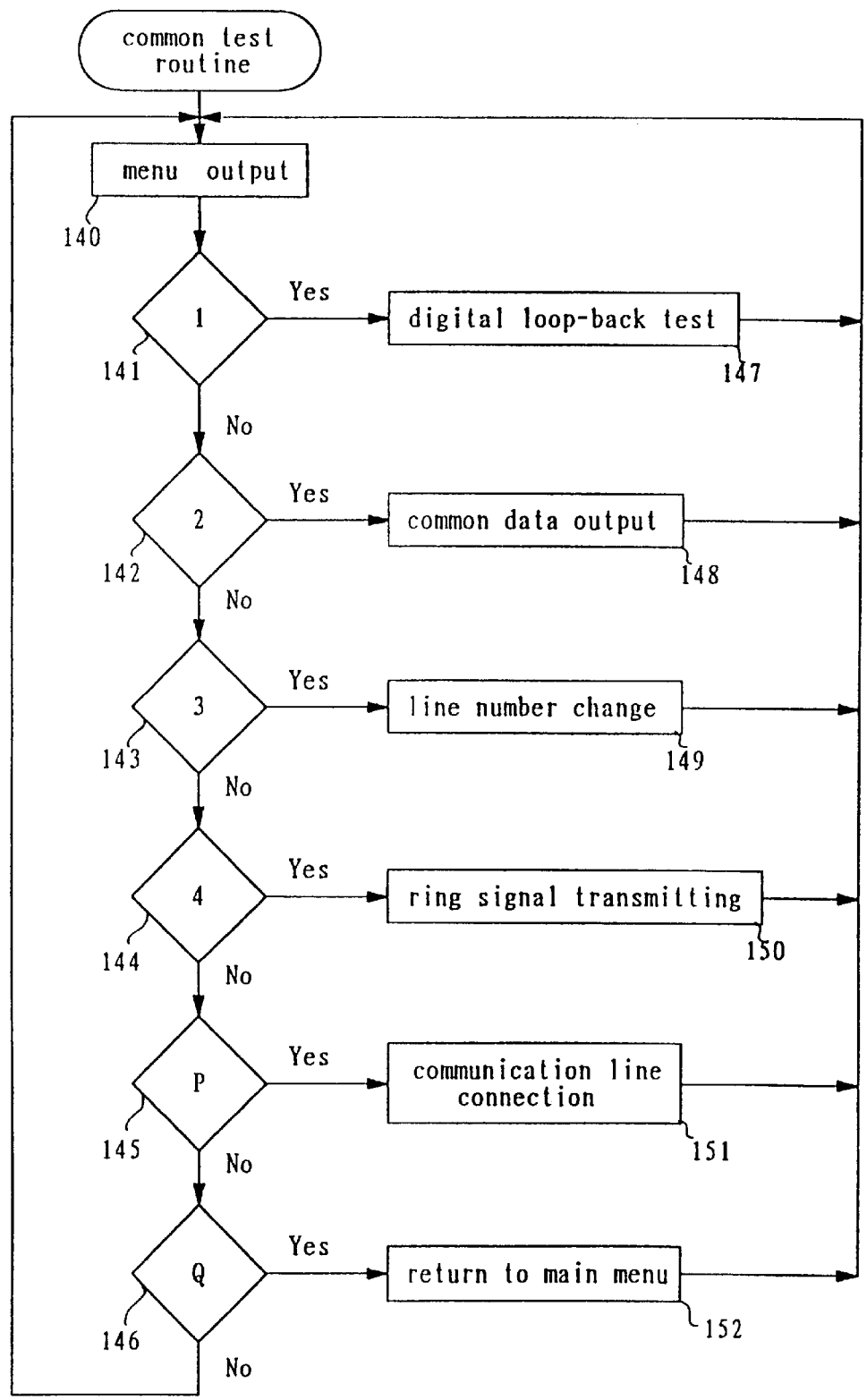
Figure 3E:
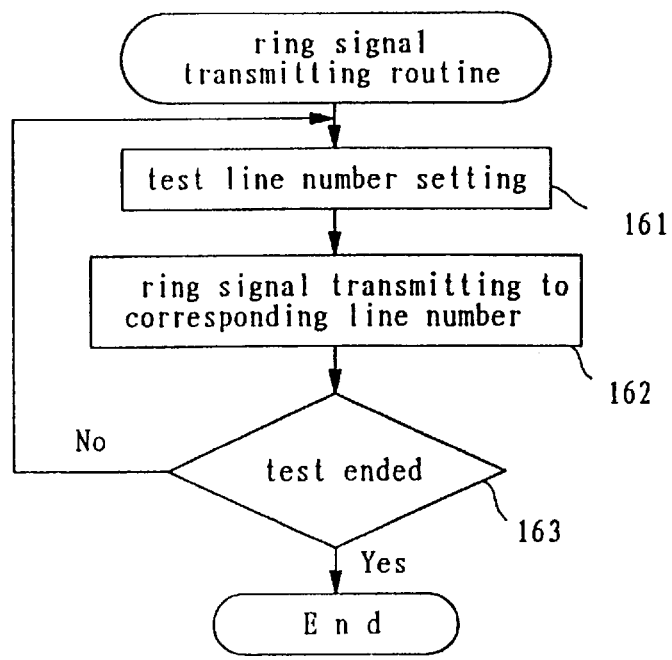

In the common test routine in the step 113, as shown in FIG. 3D, a menu is displayed in a step 140. The selected menu is judged in steps 141 through 146.

When "1" is selected in the step 141, a digital loop-back test is performed in a step 147, and when "2" is selected in the step 142, a common data is outputted in a step 148. When "3" is selected in the step 143, a line number is changed in a step 149, and when "4" is selected, a ring signal routine is performed in a step 150. When "P" is selected in the step 145, a communication line is connected in a step 151, and when "Q" is selected in the step 146, the routine is returned to the main menu in a step 152.

Here, in the ring signal transmitting routine in the step 150, as shown in FIG. 3@, a line number to be tested is set in a step 161, and a ring signal is transmitted to a corresponding line number in a step 162. Whether the test is finished or not is judged in a step 163. As a result, when the test is not finished, the routine is repeated from the step 161, and when the test is finished, the routine is ended.

Figure 3F:
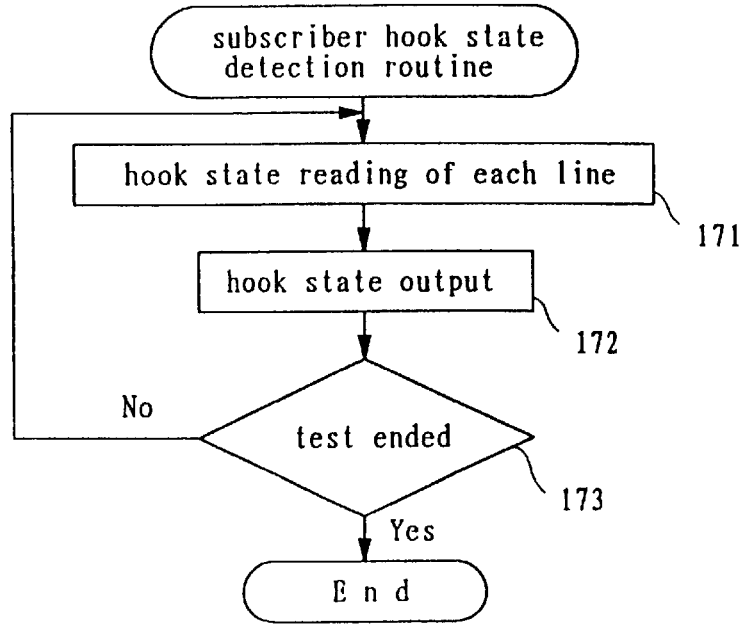

In the subscriber hook state detection routine in the step 114, as shown in FIG. 3F, the hook state of each line is read in a step 171, and then the read hook state is outputted in a step 172. Whether the test is finished or not is judged in a step 173. As a result, when the test is not finished, the routine is repeated from the step 171, and when the test is finished, the test is ended.

As described above, a telephone test device and a method of the same for an optical cable television system according to the present invention is directed to testing the telephone function of the "B" channel of an optical cable television system without using an additional switch, thus reducing the number of elements in the system and the manufacturing cost, whereby the productivity is significantly enhanced thereby.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A telephone test method for an optical cable television system, comprising the steps of:

a first step for initializing a database, selecting a predetermined bus, Cept interface boards-10, and a hardware, executing a menu, and judging the inputted menu;

a second step for performing an extended common control board assembly loop-back test routine when the extended common control board assembly is selected in the first step for testing the extended common control board assembly loop-back;

a third step for performing Cept interface boards-10 loop-back test routine when the loop-back is selected in the first step for performing the Cept interface boards-10 loop-back;

a fourth step for performing a common test routine when the common test is selected in the first step;

a fifth step for performing a subscriber hook state detection routine for detecting the subscriber hook state when the hook state detection routine is selected in the first step;

a sixth step for reading a line number when the writing routine is selected in the first step, reading a control data, and writing the control data on a corresponding line number; and a seventh step for ending a test routine when the end is selected in the first step.

2. The method of claim 1, wherein said second step includes the sub-steps of:

a first sub-step for setting a loop-back test mode;

a second sub-step for writing a data and for reading the data;

a third sub-step for comparing the data written in the second sub-step with the data read in the same;

a fourth sub-step for performing the routine from the second sub-step by judging as to whether the test is finished; and a fifth sub-step for outputting a comparison result data of the third sub-step when the test is finished.

3. The method of claim 1, wherein said third step includes the sub-steps of:

an eleventh sub-step for reading the Cept interface boards-10 or a line number and for delaying until a count data is obtained;

a twelfth sub-step for setting a loop-back test mode, writing a data, and reading the data;

a thirteenth sub-step for comparing the data written in the twelfth sub-step with the data read in the same;

a fourteenth sub-step for repeating the routines from the twelfth sub-step when the test is not finished after judging as to whether the test is finished or not; and a fifteenth sub-step for outputting the comparison result data when the test is finished.

4. The method of claim 1, wherein said fourth step includes the sub-steps of:

a twenty first sub-step for displaying the menu and for judging the selected menu;

a twenty second sub-step for performing a digital loop-back test when "1" is selected in the twenty first sub-step;

a twenty third sub-step for outputting the common data when "2" is selected in the twenty first sub-step;

a twenty fourth sub-step for changing the line number when "3" is selected in the twenty first sub-step;

a twenty fifth sub-step for performing the ring signal transmitting routine when "4" is selected in the twenty first sub-step;

a twenty sixth sub-step for connecting the communication line when "P" is selected in the twenty first sub-step; and a twenty seventh sub-step for returning to the main menu when "Q" is selected in the twenty first sub-step.

5. The method of claim 4, wherein said twenty fifth sub-step is directed to setting a line number to be tested, transmitting a ring signal to a corresponding line number, judging as to whether the test is finished, and repeating from the setting routine with respect to the line number to be tested until the test is finished.

6. The method of claim 1, wherein said fifth step is directed to reading the hook state of each line, outputting the read hook state, judging as to whether the test is finished, and repeating from the hook state reading routine with respect to each state until the test is finished.

7. A telephone test device for an optical cable television system, comprising:

Cept interface boards-10 connected to an optical cable television for processing a subscriber signal;

an extended common control board assembly for relaying the signal of the Cept interface boards-10;

a peripheral processor hardware board assembly for connecting the extended common control board assembly and a personal computer, performing an ASIP function of a TDX-10, a TD bus communication with the Cept interface boards-10, and a control of the telephone function;

a Ceib clock generator board for supplying a clock signal; and a power board unit for supplying an operation power.

8. The device of claim 7, wherein said Ceib clock generator board includes:

a clock generator for supplying a clock signal of 2.04 Mhz and 4.09 Mhz to the extended common control board assembly;

a frame synchronous generator for generating a frame synchronous signal of 8 Khz from the clock signal of 4.09 Mhz and then for supplying to the extended common control board assembly; and a PCM transmitting/receiving data connector for connecting a transmitting/receiving PCM differential data.

* * * * *